United States Patent
Lu et al.

(10) Patent No.: US 9,115,915 B2
(45) Date of Patent: Aug. 25, 2015

(54) SUPPORT ASSEMBLY FOR PHOTOVOLTAIC PANELS

(75) Inventors: Kai-Ming Lu, Taipei Hsien (TW); Ren Wang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 1149 days.

(21) Appl. No.: 12/888,416

(22) Filed: Sep. 23, 2010

(65) Prior Publication Data

US 2011/0309215 A1 Dec. 22, 2011

(30) Foreign Application Priority Data

Jun. 21, 2010 (CN) ...................... 2010 2 0230857 U

(51) Int. Cl.
| | |
|---|---|
| F24J 2/46 | (2006.01) |
| F24J 2/52 | (2006.01) |
| H01L 31/042 | (2014.01) |
| F24J 2/54 | (2006.01) |

(52) U.S. Cl.
CPC ................ *F24J 2/526* (2013.01); *F24J 2/5232* (2013.01); *F24J 2/5254* (2013.01); *H02S 20/00* (2013.01); *F24J 2002/5277* (2013.01); *F24J 2002/5486* (2013.01); *Y02E 10/47* (2013.01); *Y02E 10/50* (2013.01)

(58) Field of Classification Search
CPC .. H01L 31/042; H01L 31/0422; F16M 13/02; F24J 2/52; F24J 2/00
USPC ......... 211/189, 195; 108/124, 155, 157.1, 65, 108/115; 248/167, 170, 436, 173, 176.1, 248/178.1, 672, 681, 676, 678, 163.1; 52/173.3, 586.1, 200, 22, 251, 586.2, 52/582.1, 656.1, 65, 726.2; 126/623, 704; 136/251; 403/64, 150, 151; 16/360
See application file for complete search history.

(56) References Cited

U.S. PATENT DOCUMENTS

| | | | | |
|---|---|---|---|---|
| 1,714,698 | A | * | 5/1929 | Stoll .............................. 403/100 |
| 4,269,173 | A | * | 5/1981 | Krueger et al. ............... 126/634 |
| 7,717,376 | B2 | * | 5/2010 | Sparks, Jr. ..................... 248/145 |
| 2002/0083869 | A1 | * | 7/2002 | Verheyen ....................... 108/115 |
| 2008/0030029 | A1 | * | 2/2008 | McGinnis .................. 292/259 R |
| 2010/0236183 | A1 | * | 9/2010 | Cusson et al. .................. 52/645 |
| 2010/0243023 | A1 | * | 9/2010 | Patton et al. ................... 136/244 |
| 2010/0275974 | A1 | * | 11/2010 | Chan et al. ..................... 136/251 |

FOREIGN PATENT DOCUMENTS

| | | | | |
|---|---|---|---|---|
| GB | 2238827 | A | * | 6/1991 |
| JP | 09235844 | A | * | 9/1997 |

* cited by examiner

*Primary Examiner* — Kimberly Wood
(74) *Attorney, Agent, or Firm* — Novak Druce Connolly Bove + Quigg LLP

(57) ABSTRACT

A support assembly for supporting photovoltaic panels includes a plurality of support units connected one by one. Each of the plurality of support units includes a support beam, a pair of standing posts, a strengthening bar and at least one horizontal beam. The pair of standing posts, the strengthening bar and the at least one horizontal beam are pivotably mounted on the support beam via connecting members. When used, the strengthening bar rotates relative to the support beam and collectively constitutes a triangle with the support beam and one of the pair of standing posts to avoid distortion. When packaged, the pair of standing posts and the strengthening bar rotate relative to the support beam to be received in the receiving groove respectively, and the at least one horizontal beam rotates relative to and is disposed in parallel to the support beam.

9 Claims, 6 Drawing Sheets

SUPPORT ASSEMBLY FOR PHOTOVOLTAIC PANELS

BACKGROUND

1. Technical Field

The present disclosure relates to a photovoltaic panel, and more particularly to a support assembly for photovoltaic panels.

2. Description of Related Art

A support assembly for photovoltaic panels is designed to be foldable to reduce size during transport. Generally, the foldable support assembly is manufactured as individual components, where a great number of bolts are needed to assemble all the components together as finished product. It is often difficult and inconvenient to assemble all components together to form the support assembly. Therefore, how to make the support assembly take smaller space and be installed in convenience is a problem.

Therefore, a need exists in the industry to overcome the described problem.

BRIEF DESCRIPTION OF THE DRAWINGS

Many aspects of the present embodiments is better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
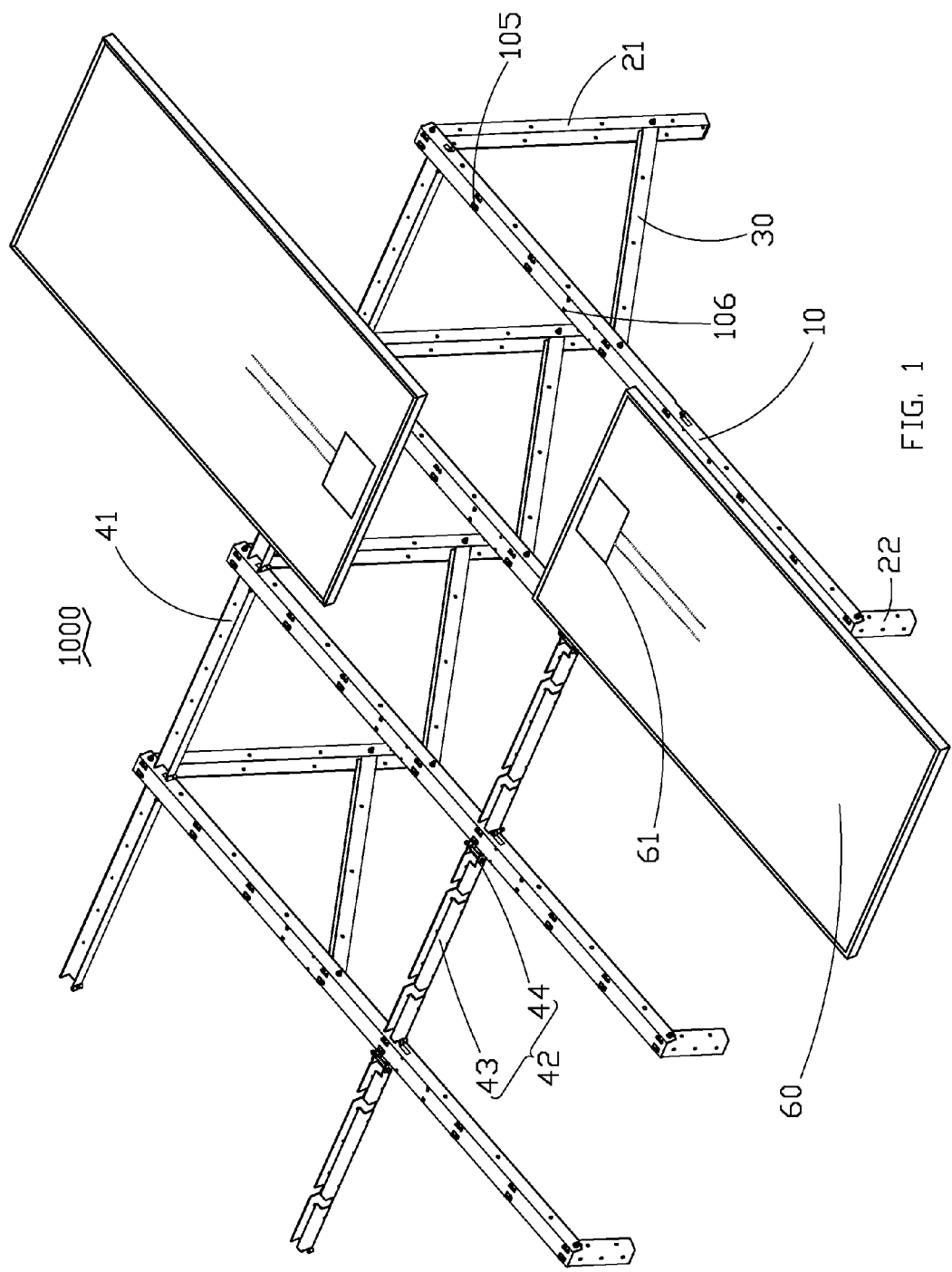
FIG. 1 is an isometric view of an embodiment of a support assembly supporting photovoltaic panels in accordance with the present disclosure.
Figure 2:
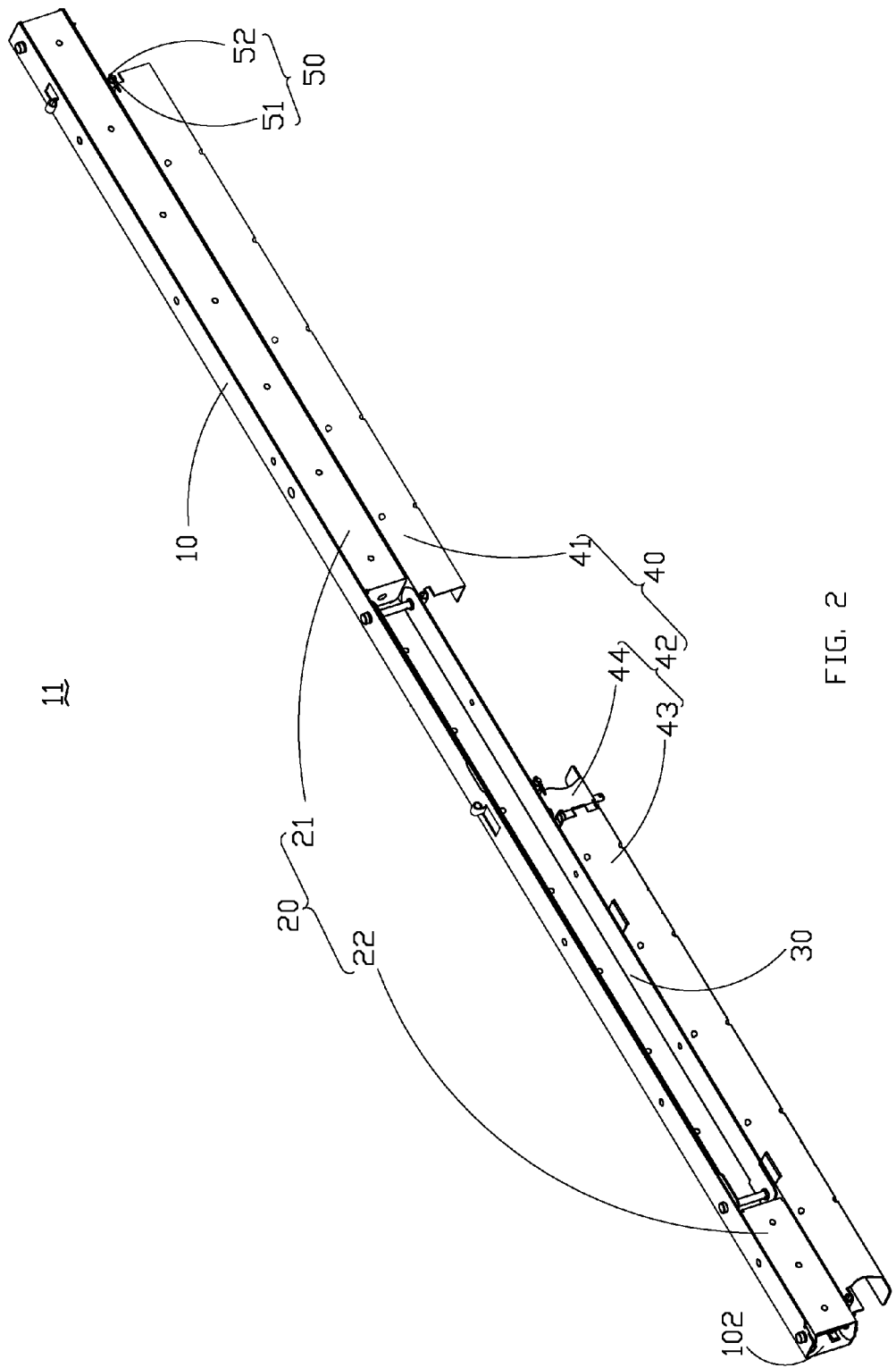
FIG. 2 is a perspective view of the embodiment of a support unit when packaged and transported in accordance with the present disclosure.

Referring to FIG. 1 and FIG. 2, a support assembly 1000 for supporting photovoltaic panels 60 comprises a plurality of support units 11 connected one by one. Each of the plurality of support units 11 comprises a support beam 10, a pair of standing posts 20, a strengthening bar 30 and at least one horizontal beam 40. The pair of standing posts 20, the strengthening bar 30 and the at least one horizontal beam 40 are pivotably mounted on the support beam 10. The pair of standing post 20 and the strengthening bar 30 rotate relative to the support beam 10 and are received in the support beam 10 respectively, and the at least one horizontal beam 40 rotates relative to the support beam 10 and is disposed in parallel to the support beam 10, when each of the plurality of support units 11 is packaged and transported. Thus, the support unit 11 has a regular shape and is convenient for transportation when packaged in this way. When the plurality of support units 11 are assembled, the at least one horizontal beam 40 is connected to the neighboring support unit 11, the pair of standing posts 20 are unwound and disposed in parallel and the strengthening bar 30 rotates relative to the support beam 10 to constitute a triangle with the support beam 10 and one of the pair of standing posts 20 collectively.

Figure 3:
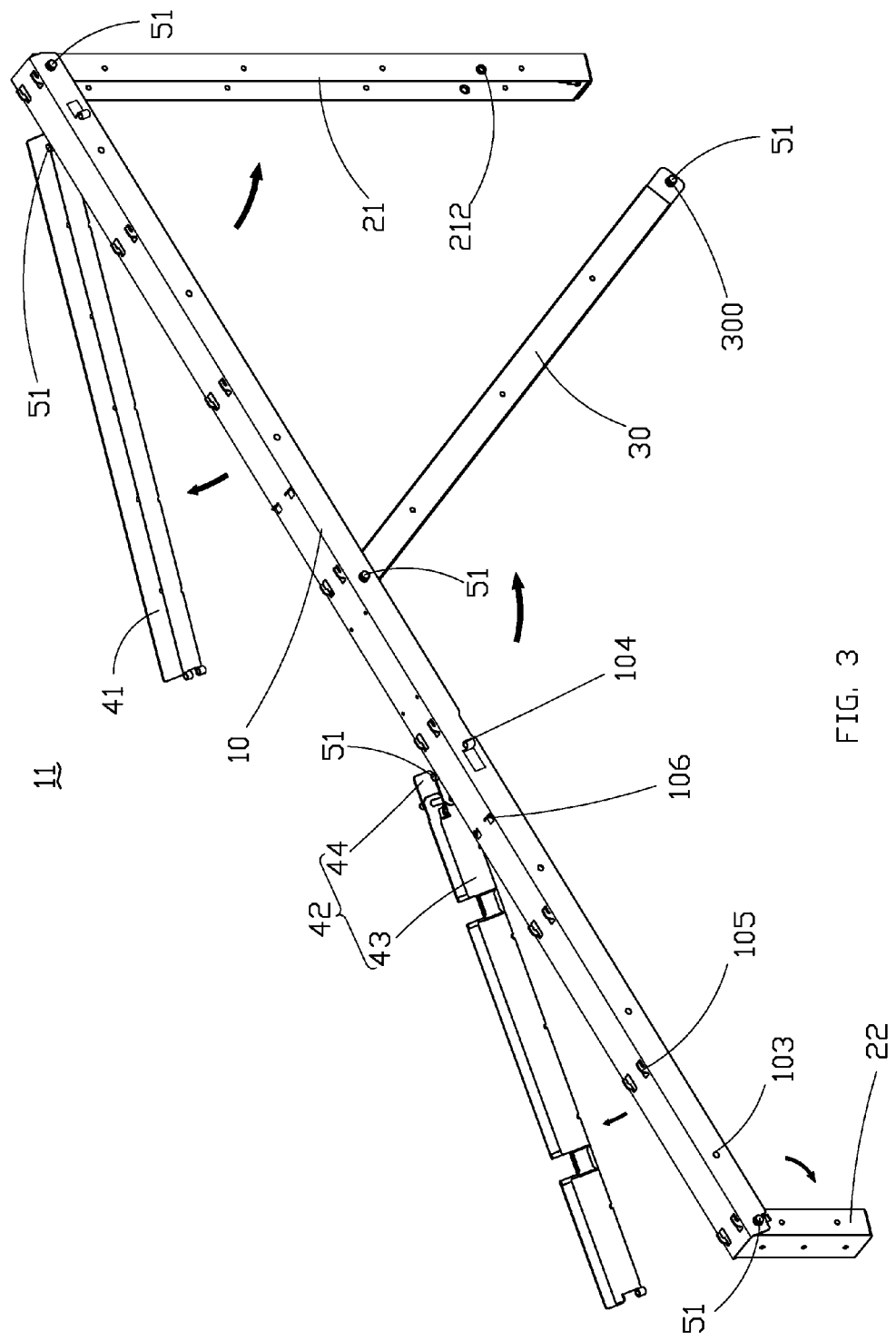
FIG. 3 is a perspective view of the embodiment of the support unit when used in accordance with the present disclosure.
Figure 4:
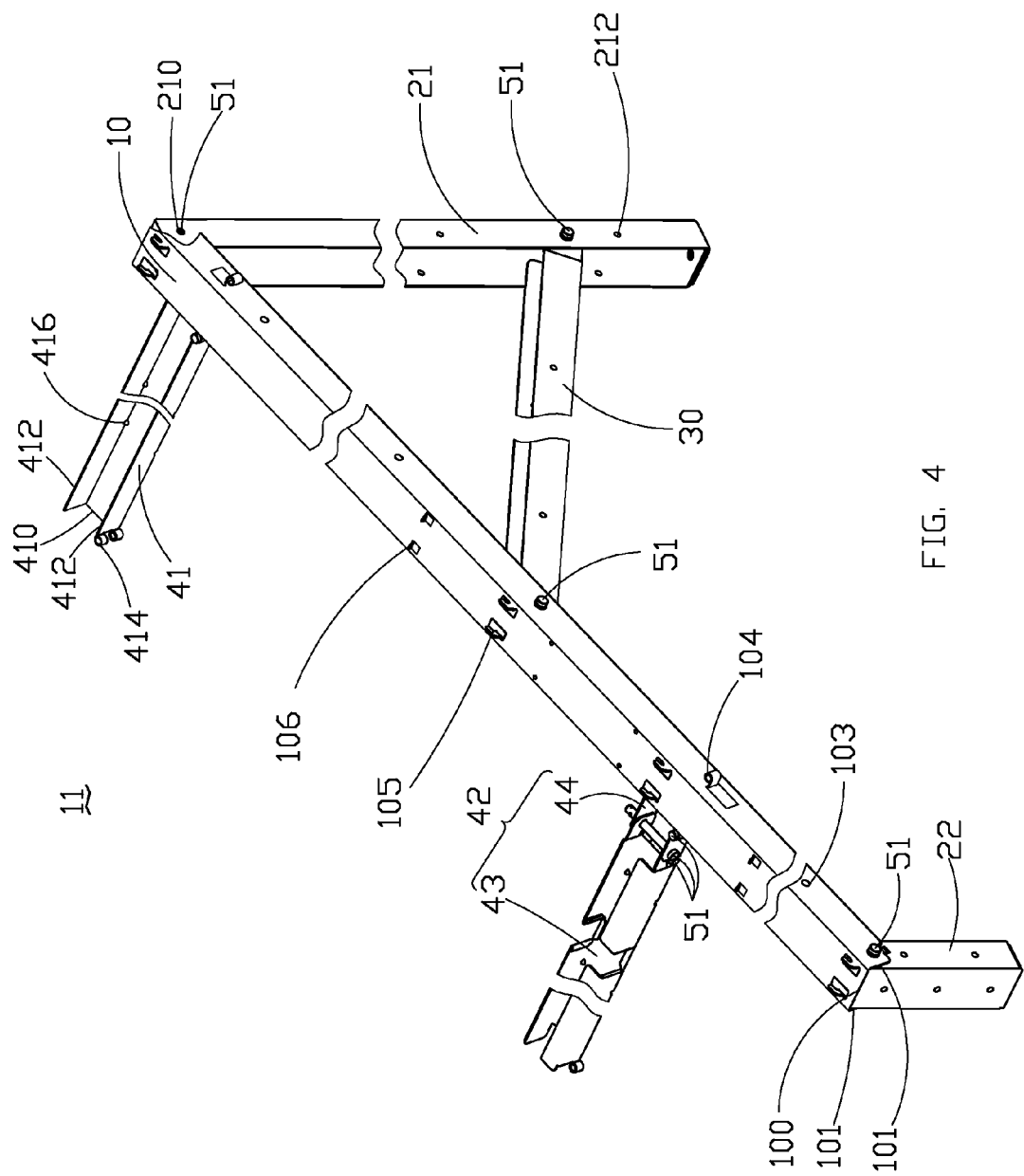
FIG. 4 is an isometric view of the embodiment of the support unit when used in accordance with the present disclosure.

Referring to FIG. 3 and FIG. 4, the support beam 10 comprises a top portion 100 and a pair of side portions 101 perpendicularly extending from two edges of the top portion 100 respectively. The top portion 100 and the pair of side portions 101 collectively define a receiving groove 102 used to receive the pair of standing posts 20 and the strengthening bar 30, as shown in FIG. 2. In the illustrated embodiment, a cross section of the receiving groove 102 is in a U shape. The top portion 100 comprises a plurality of latching portions 105 and a plurality of stopper portions 106 to secure the photovoltaic panels 60 thereon. In the illustrated embodiment, the plurality of latching portions 105 and the plurality of stopper portions 106 are punched from the top portion 100 in two parallel rows, two of the plurality of latching portions 105 and two of the plurality of stopper portions 106 are disposed side by side, respectively. Each of the pair of the side portions 101 defines a plurality of fixing holes 103 arranged in order. The plurality of fixing holes 103 are configured to install the standing post 20 and the strengthening bar 30 by use of connecting shafts 51 onto the support beam 10 respectively. In the illustrated embodiment, inclination of the support beam 10 is adjustable by matching one end of the strengthening bar 30 with different fixing holes 103 in the side portions 101.

Figure 5:
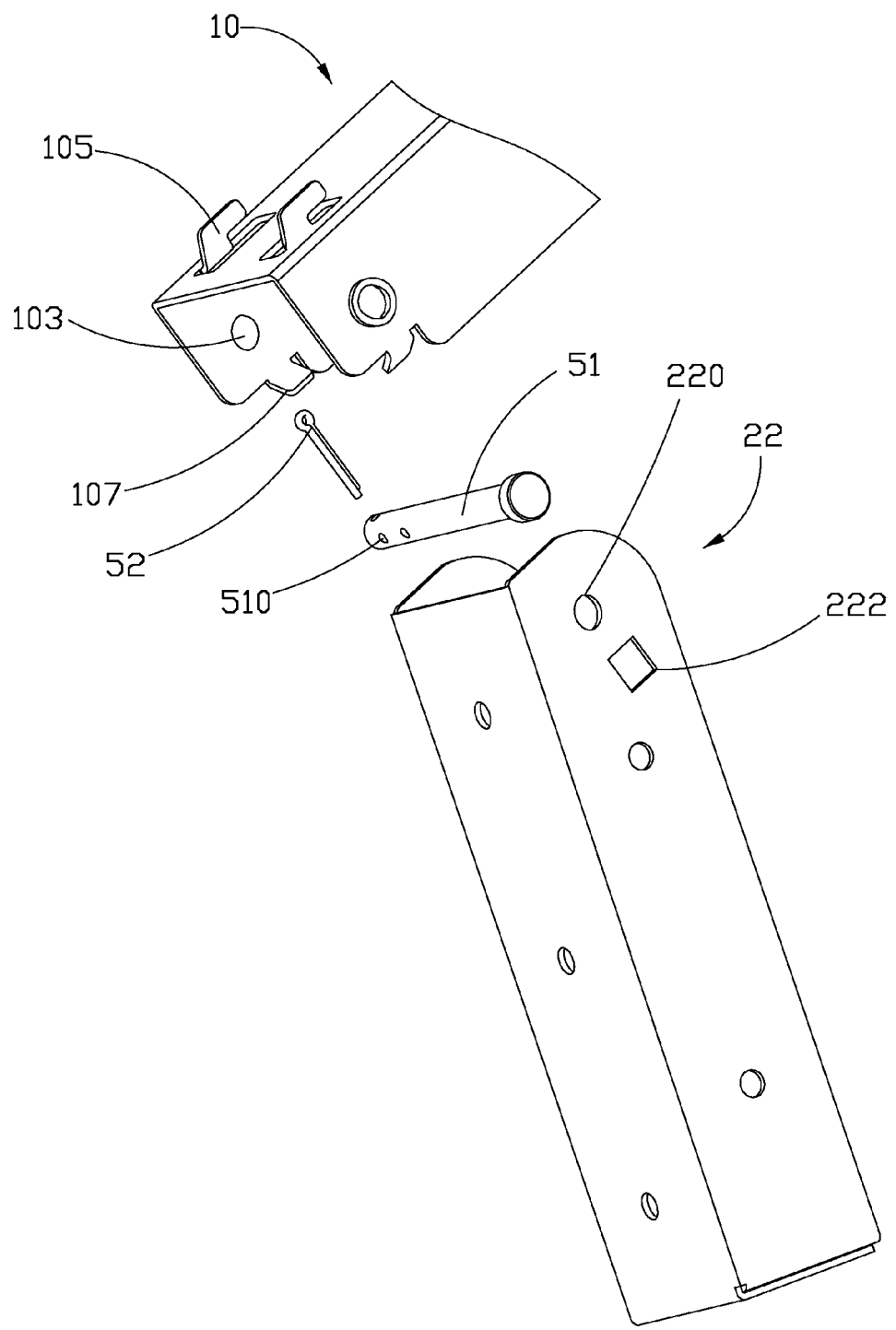
FIG. 5 is a partially disassembled view of the embodiment of a support beam and a second standing post in accordance with the present disclosure.

Referring to FIG. 2 and FIG. 5, a connecting member 50 is used to pivotably mount the pair of standing posts 20, the strengthening bar 30 and the at least one horizontal beam 40 to the support beam 10 and comprises a connecting shaft 51 and a cotter pin 52. The connecting shaft 51 defines a plurality of shaft holes 510. Each of the plurality of shaft holes 510 is a through hole along the radial direction of the connecting shaft 51. The cotter pin 52 is inserted into the shaft hole 510 to engage with the connecting shaft 51 to prevent the connecting shaft 51 disengaging. In the illustrated embodiment, the connecting member 50 may be a bolt with a nut or a rivet.

Referring to FIG. 2, the pair of standing posts 20 comprise a first standing post 21 and a second standing post 22 in parallel with each other. In the illustrated embodiment, cross sections of the first standing post 21 and the second standing post 22 are in a U-shape, respectively. Referring to FIG. 4, one end of the first standing post 21 is pivotably mounted on the support beam 10, and the other end is securely mounted on a mounting ground. The first standing post 21 defines a pair of first securing holes 210 and a plurality of first strengthen holes 212. The pair of first securing holes 210 are located on one end of the first standing post 21 and engage with the corresponding fixing hole 103 by use of connecting shafts 51 to pivotably mount the first standing post 21 onto the support beam 10, then the cotter pin 52 is inserted into the shaft hole 510 to prevent the connecting shaft 51 disengaging. The first standing post 21 rotates around the connecting shaft 51 and is received in the receiving groove 102 when packaged and/or transported. When used, the first standing post 21 should be rotated along the arrowhead direction as shown in FIG. 3. The plurality of first strengthen holes 212 are evenly apart from each other and arranged in pairs to engage with the strengthening bar 30.

Referring to FIG. 3 and FIG. 4, the strengthening bar 30 with two ends is mounted to the support beam 10 and the first standing post 21 respectively. In the illustrated embodiment, the strengthening bar 30 defines two pairs of second strengthen holes 300. The two pairs of second strengthen holes 300 are located on the two ends of the strengthening bar 30 and engage with the corresponding fixing hole 103 and the corresponding first strengthen hole 212 by use of connecting shafts 51 respectively. Then, the cotter pin 52 is inserted into the corresponding shaft hole 510 to prevent the corresponding connecting shaft 51 disengaging. Thus, the support beam 10, the first standing post 21 and the strengthening bar 30 collectively configure a triangle to avoid distortion. When packaged and/or transported, one end of the strengthening bar 30 rotates around one connecting shaft 51 relative to the support beam 10 by disengaging with the first standing post 21 and is received in the receiving groove 102. When used, the strengthening bar 30 should be rotated along the arrowhead direction as shown in FIG. 3.

Referring to FIG. 4, when used, the second standing post 22 and the first standing post 21 rotate around the respective connecting shaft 51 relative to the support beam 10. In the illustrated embodiment, a length of the second standing post 22 is shorter than that of the first standing post 21 so that the support beam 10 is inclined to a certain angle. Referring to FIG. 5, the second standing post 22 defines a pairs of second securing holes 220 and a pair of latching holes 222. The pair of the second securing holes 220 is defined in one end of the second standing post 22, and the pair of latching holes 222 are defined beside the pair of the second securing holes 220. The connecting shaft 51 passes through the fixing hole 103 and the pair of second securing holes 220 to pivotably mount the second standing post 22 onto the support beam 10, and the cotter pin 52 is inserted into the shaft hole 510 to prevent the connecting shaft 51 disengaging. When packaged and/or transported, the second standing post 22 rotates around the corresponding connecting shaft 51 relative to the support beam 10 and is received in the receiving groove 102. Each side portion 101 of the support beam 10 comprises a latching clip 107. The latching clip 107 is located on one end of the support beam 10 neighboring to the second standing post 22. The latching clip 107 is bent towards the receiving groove 102. In the illustrated embodiment, the latching clip 107 is integrally formed with the side portion 101. When used, the second standing post 22 rotates along the arrowhead direction as shown in FIG. 3, and the latching clip 107 engages with the corresponding latching hole 222 to securely mount the second standing post 22 onto the support beam 10.

Referring to FIG. 4, each of the pair of the side portions 101 further comprises a plurality of roll portions 104 arranged in order. Each of the plurality of roll portions 104 is engaged with the at least one horizontal beam 40 to pivotably mount the at least one horizontal beam 40 onto the support beam 10. In the illustrated embodiment, the plurality of roll portions 104 are integrally formed with the side portion 101. The at least one horizontal beam 40 with one end is pivotably mounted to the support beam 10 and the other end is configured to connect to a neighboring support unit 11. The at least one horizontal beam 40 comprises a first horizontal beam 41 and a second horizontal beam 42. In the illustrated embodiment, cross sections of the first horizontal beam 41 and the second horizontal beam 42 are in a U shape, respectively.

The first horizontal beam 41 is pivotably mounted between two neighboring support beams 10. The first horizontal beam 41 comprises a first bottom portion 410 and a pair of first side walls 412 bent in parallel from two edges of the first bottom portion 410 respectively. The first horizontal beam 41 defines two first double sleeves 414 on two ends thereof and on the same side of the side wall 412. The first double sleeve 414 matches with the corresponding roll portion 104 to pivotably connect one end of the first horizontal beam 41 to the support beam 10 by use of the connecting shaft 51. Then the cotter pin 52 is inserted into the corresponding shaft hole 510 to prevent the connecting shaft 51 disengaging. The other end of the first horizontal beam 41 is mounted onto the neighboring support beam 10 by the same method. Thus, the first horizontal beam 41 is mounted between two support units 11 to support the photovoltaic panel 60. When packaged and/or transported, one end of the first horizontal beam 41 rotates around the corresponding connecting shaft 51 relative to the support beam 10 by removing the other connecting shaft 51 and is folded to get close to the side portion 101 of the support beam 10. When used, the first horizontal beam 41 should be rotated along the arrowhead direction as shown in FIG. 3. The first horizontal beam 41 further defines a plurality of first drainage holes 416 on joint portions between the first bottom portion 410 and the pair of first side walls 412 for draining.

Referring to FIG. 4, the second horizontal beam 42 is parallel with the first horizontal beam 41 and pivotably mounted between two neighboring support beams 10. The second horizontal beam 42 comprises a support portion 43 and a connecting portion 44. One end of the support portion 43 is movably mounted on one end of the connecting portion 44 and the other end is mounted on the side portion 101 of the support beam 10. The other end of the connecting portion 44 is movably mounted on the side portion 101 of the neighboring support beam 10. In the illustrated embodiment, rotation plane of the connecting portion 44 rotating relative to the support beam 10 is perpendicular to that of the support portion 43 rotating relative to the connecting portion 44, thus, it is convenient to mount or disassemble the support portion 43 and to fold the second horizontal beam 42 close to the support beam 10.

Figure 6:
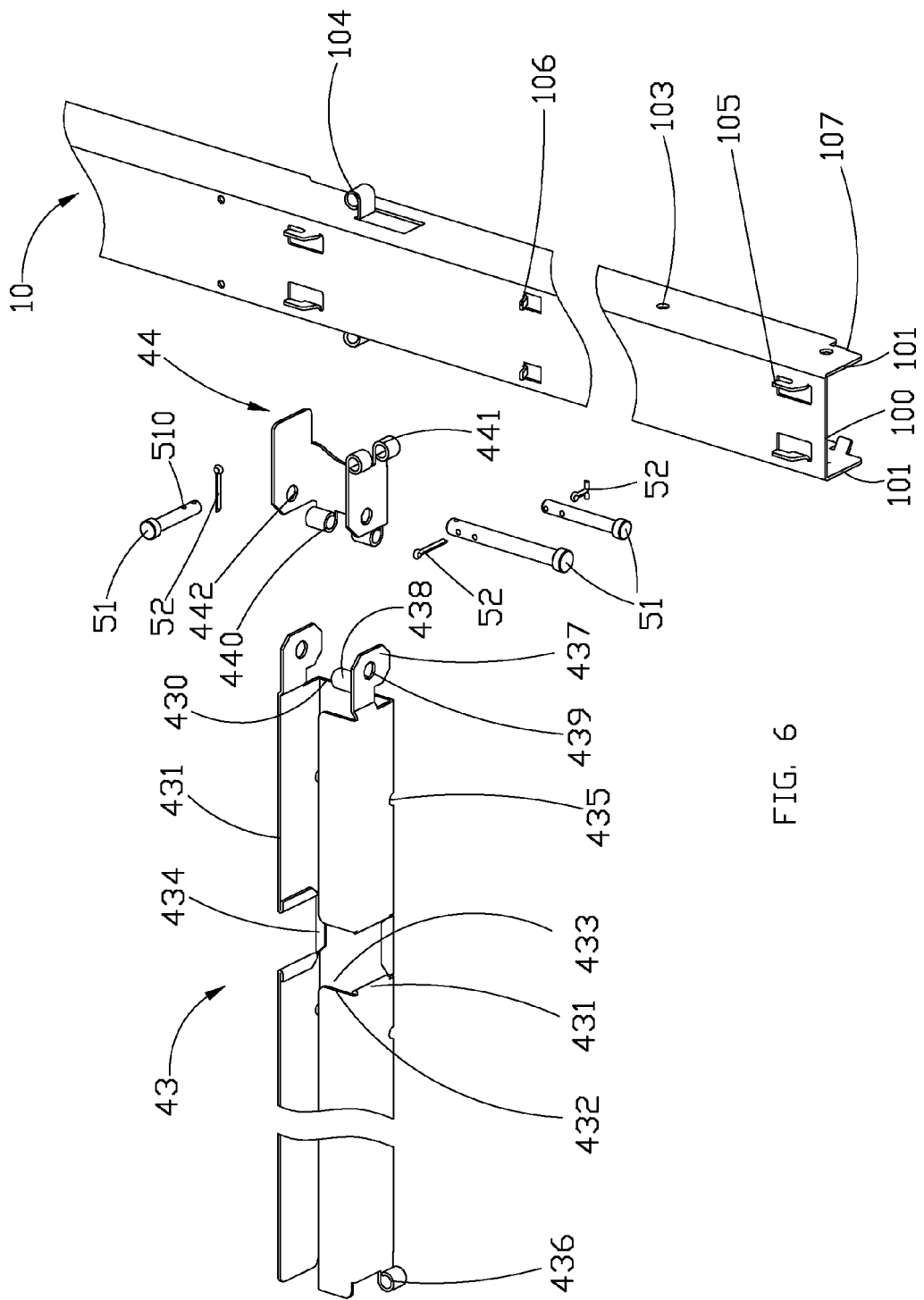
FIG. 6 is a partially disassembled view of the embodiment of the support beam and a first horizontal beam in accordance with the present disclosure.

Referring to FIG. 6, the support portion 43 comprises a second bottom portion 430, a pair of second side walls 431 bent in parallel from two edges of the second bottom portion 430 respectively and a cover portion 432 parallel with the second bottom portion 430. The cover portion 432 is bent along one of the pair of second side walls 431 and is spaced apart from the other of the pair of second side walls 431. A receiving portion 433 is cooperatively defined by the second bottom portion 430, the pair of the second side walls 431 and the cover portion 432. The receiving portion 433 is used to receive power cords (not shown) from a jack box 61 of the photovoltaic panel 60 (as shown in FIG. 1). The support portion 43 defines a plurality of latching notches 434 to securely install the photovoltaic panel 60. Each of the plurality of latching notches 434 is formed by punching a part of the pair of second side walls 431 and the cover portion 432. The power cords are distributed into the receiving portion 433 through the plurality of latching notches 434. The second horizontal beam 42 defines a plurality of second watering drainage holes 435 on joint portions between the second bottom portion 430 and the pair of second side walls 431 for draining.

A single sleeve 436 is defined on one of the pair of second side walls 431 to engage with the corresponding roll portion 104 so as to mount the second horizontal beam 42 on the support beam 10. Thus, the support assembly 1000 is configured by a plurality of support units 11 to enlarge support area for photovoltaic panels 60 freely. A pair of protruding walls 437 are disposed on two side walls 431 of the end of the support portion 43 respectively and define a pair of first through holes 439 correspondingly. A protruding post 438 is protruded outwardly from one of the pair of protruding walls 437 towards the receiving portion 433. The protruding post 438 and the single sleeve 436 are located on two opposite sides of the second side wall 431. The pair of first through holes 439 and the protruding post 438 are engaged with the connecting portion 44 to movably mount the support portion 43 onto the connecting portion 44.

In the illustrated embodiment, a cross section of the connecting portion 44 is in a U shape. The connecting portion 44 comprises a horizontal double sleeve 440 and a perpendicular double sleeve 441 perpendicular to the horizontal double sleeve 440, and defines a pair of second through holes 442. The horizontal double sleeve 440 is located on the bottom of the connecting portion 44 and engaged with the protruding post 438 to pivotably mount the connecting portion 44 onto the support portion 43 by use of the connecting shaft 51. To distribute the power cords (not shown), the support portion 43 is rotated relative to the connecting portion 44 away from the photovoltaic panel 60. The pair of second through holes 442 are located on two sides of the connecting portion 44 and engaged with the pair of first through holes 439 to securely mount the support portion 43 onto the connecting portion 44 by use of the connecting shaft 51. Then, the cotter pin 52 is inserted into the corresponding shaft hole 510 to prevent the connecting shaft 51 disengaging. The perpendicular double sleeve 441 is located on the same side of the second horizontal beam 42 with the single sleeve 436. The perpendicular double sleeve 441 matches with the corresponding roll portion 104 to pivotably connect the connecting portion 44 to the side portion 101 by use of the connecting shaft 51, and the cotter pin 52 is inserted into the corresponding shaft hole 510 to prevent the connecting shaft 51 disengaging. When packaged and/or transported, the connecting portion 44 is rotated around the connecting shaft 51 with the support portion 43 and the second horizontal beam 42 is folded to be close to the side portion 101. When used, the second horizontal beam 42, the second horizontal beam 42 should be rotated along the arrowhead direction as shown in FIG. 3.

The first standing post 21, the second standing post 22 and the strengthening bar 30 are pivotably mounted on the support beam 10 by use of the connecting shafts 51 and rotate around the corresponding connecting shaft 51 relative to the support beam 10 to be received into the receiving groove 102 when packaged and/or transported. Similarly, the first standing post 21, the second standing post 22 and the strengthening bar 30 rotate around the corresponding connecting shaft 51 to open each other respectively. The first horizontal beam 41 is pivotably mounted on the roll portion 104 by use of the connecting shaft 51 and rotates around the connecting shaft 51 to be folded to get close to the side portion 101 when packaged and/or transported. The connecting portion 44 and the support portion 43 are pivotably mounted on the support beam 10 by use of the connecting shaft 51. The connecting portion 44 rotates around the corresponding connecting shaft 51 to fold the second horizontal beam 42 to get close to the side portion 101. The support portion 43 rotates around the corresponding connecting shaft 51 relative to the connecting portion 44 to distribute the power cords conveniently.

Although the features and elements of the present disclosure are described as embodiments in particular combinations, each feature or element is used alone or in other various combinations within the principles of the present disclosure to the full extent indicated by the broad general meaning of the terms in which the appended claims are expressed.

What is claimed is:

1. A support assembly for photovoltaic panels, the support assembly comprising a plurality of support units connected one by one, each of the plurality of support units comprising:
   a support beam, comprising a top portion and a pair of side portions perpendicularly extending from two edges of the top portion respectively, the top portion and the pair of side portions collectively defining a receiving groove;
   a pair of standing posts, each with one end pivotably mounted on the support beam;
   a strengthening bar, with two ends mounted to the support beam and one of the pair of standing posts respectively;
   at least one horizontal beam, with one end of the at least one horizontal beam pivotably mounted to the support beam, and the other end of the at least one horizontal beam being configured to connect to a neighboring support unit,
   wherein the at least one horizontal beam comprises a first horizontal beam, each of the pair of the side portions comprises a plurality of roll portions arranged in order, the first horizontal beam defines two first double sleeves on two ends thereof, one of the first double sleeves matches with the corresponding roll portion to pivotably connect the first horizontal beam to the support beam; and
   wherein the pair of standing posts and the strengthening bar rotate relative to the support beam and are received in the receiving groove respectively, and the at least one horizontal beam rotates relative to the support beam and is disposed in parallel to the support beam, when each of the plurality of support units is packaged;
   wherein, when the support units are assembled, the at least one horizontal beam is connected to the neighboring support unit, the pair of standing posts are unwound and disposed in parallel and, the strengthening bar rotates relative to the support beam to constitute a triangle with the support beam and one of the pair of standing posts collectively;
   wherein the top portion comprises a plurality of latching portions and a plurality of stopper portions to secure the photovoltaic panels, the plurality of latching portions and the plurality of stopper portions are punched from the top portion in two parallel rows;
   wherein the at least one horizontal beam comprises a second horizontal beam in parallel with the first horizontal beam, cross sections of the first horizontal beam and the second horizontal beam are in a U shape, respectively;
   wherein the plurality of roll portions are integrally formed with the side portion;
   wherein the second horizontal beam comprises a support portion and a connecting portion, the support portion is mounted between the support beam and the connecting portion, the connecting portion is mounted between the support portion and the neighboring support beam;
   wherein a rotation plane of the connecting portion rotating relative to the support beam is substantially perpendicular to the support portion rotating relative to the connecting portion;
   wherein the support portion comprises a receiving portion to receive power cords of the photovoltaic panels;
   wherein the support portion comprises a protruding post protruding towards the receiving portion, the connecting portion comprising a horizontal double sleeve to engage with the protruding post to pivotably mount the connecting portion onto the support portion; and
   wherein the connecting portion further comprises a perpendicular double sleeve substantially perpendicular to the horizontal double sleeve and matching with the corresponding roll portion to pivotably connect the connecting portion to the support beam, the support portion defining a single sleeve engagable with the corresponding roll portion to mount the second horizontal beam on the support beam.

2. The support assembly as claimed in claim 1, wherein each of the pair of the side portions defines a plurality of fixing holes arranged in order, the plurality of fixing holes are configured to install the standing post and the strengthening bar onto the support beam respectively.

3. The support assembly as claimed in claim 2, wherein inclination of the support beam is adjustable by matching one end of the strengthening bar with different fixing holes in the side portions.

4. The support assembly as claimed in claim 1, wherein a connecting member is used to pivotably mount the pair of standing posts, the strengthening bar and the at least one horizontal beam to the support beam and comprises a connecting shaft and a cotter pin, the connecting shaft defines a plurality of shaft holes to engage with the cotter pins to prevent the connecting shaft disengaging.

5. The support assembly as claimed in claim 4, wherein each of the plurality of shaft holes is a through hole along a radial direction of the connecting shaft.

6. The support assembly as claimed in claim 1, wherein the pair of standing posts comprise a first standing post and a second standing post in parallel with each other, cross sections of the first standing post and the second standing post are in a U-shape, respectively.

7. The support assembly as claimed in claim 6, wherein a length of the second standing post is shorter than that of the first standing post so that the support beam is inclined to a certain angle.

8. The support assembly as claimed in claim 7, wherein the second standing post defines a pair of latching holes, each of the pair of side portions comprises a latching clip engaging with the corresponding latching hole to securely mount the second standing post onto the support beam.

9. The support assembly as claimed in claim 1, wherein the first horizontal beam defines a plurality of first watering drainage holes and the second horizontal beam defines a plurality of second watering drainage holes for draining.

* * * * *